United States Patent

[11] 3,616,229

| [72] | Inventors | Bernard S. Wildi<br>Kirkwood;<br>Ernest G. Jaworski, Olivette; Thomas L.<br>Westman, St. Louis, all of Mo. |
|---|---|---|
| [21] | Appl. No. | 763,370 |
| [22] | Filed | Sept. 27, 1968 |
| [45] | Patented | Oct. 26, 1971 |
| [73] | Assignee | Monsanto Company<br>St. Louis, Mo. |

[54] POLYMER-ENZYME PRODUCTS COMPRISING PLURALITY OF ENZYMES COVALENTLY BOUND TO POLYMER
19 Claims, No Drawings

[52] U.S. Cl. .................................... 195/63,
    195/63, 195/DIG. 11, 195/68
[51] Int. Cl. ....................................... C12k 1/00
[50] Field of Search ............................ 195/63, 63
    P, 66, 68

[56] References Cited
    UNITED STATES PATENTS

| 3,436,309 | 4/1969 | Ottinger et al. | 195/63 X |
| 3,506,582 | 4/1970 | Gertzman | 195/68 |
| 3,507,750 | 4/1970 | Murray et al. | 195/66 |

OTHER REFERENCES

Goldstein, et al., Biochemistry. Vol. 3, No. 12, Dec. 1964. (Pages 1913–1914).

Hornby, et al., Biochemical Journal. 1966. Vol. 98 (Pages 420–425).

Proceedings of the Biochemical Society. Biochemical Journal. Vol. 107, March 1968. (pages 2P, 3P and 5P).

*Primary Examiner*—Lionel M. Shapiro
*Assistant Examiner*—D. M. Naff
*Attorneys*—Gordon W. Hueschen, Hueschen and Kurlandsky and John D. Upham ABSTRACT: Polymer-enzyme products comprising a plurality of enzymes covalently bound to the polymer chain, the plurality of enzymes in any case including one or a plurality of proteases, preferably both a neutral protease and an alkaline protease, and optimally also a third enzyme, e.g., amylase. The products have improved stability and applicability over a wide range due to their increased range of enzymatic activity. They are either water-soluble or water-insoluble and in either case substantially odorless and colorless, long-acting and, in this covalently-bound polymeric state, not subject to the usual disadvantage of autogenous deterioration characteristic of simple enzyme mixtures.

POLYMER-ENZYME PRODUCTS COMPRISING PLURALITY OF ENZYMES COVALENTLY BOUND TO POLYMER

BACKGROUND OF INVENTION

1. Field of Invention

Polymer-enzyme products wherein enzyme is covalently bound; plurality of enzymes.

2. Prior Art

Enzymes are commonly referred to as biological catalysts and have many established uses in the textile, food, pharmaceutical, brewing, and detergent areas. A limited number of polymeric enzyme products, wherein the enzyme is covalently bound, are known. Other insoluble polymeric products wherein the enzyme is not covalently bound are also known. Insoluble trypsin-ethylene maleic anhydride (EMA) products wherein the trypsin, an alkaline protease [Hackh's Chemical Dictionary, Grant, 3rd Ed. by McGraw Hill Book Company, N.Y. (1944), page 873], is covalently bound have been reported [Levin et al. and Goldstein et al., Biochemistry 3, 1905 and 1913 (1964) and Ong et al., J. Biol Chem. 241, 5661 (1966)]. See also Patchornik U.S. Pat. No. 3,278,392—cellulose-enzyme covalently bonded thereto, and Katchalski et al., U.S. Pat. No. 3,167,485—diazotization coupling of enzyme to paraaminophenylalanine leucine copolymer. These products have involved coupling of a single enzyme to the polymer and generally have a range of activity approximating that of the native enzyme, with adjustment in some cases for pH shifts of optimal activity. In addition, native enzymes are known which have activities at different pH ranges, and against different substrates. To combine these native enzymes into a single mixture for purposes of attaining a broader range of activities and activities against different substrates might be a possibility, but an unsatisfactory solution to the problem since enzyme combinations are usually at least partially subject to autodigestion which results not only in at least partial inactivation of one or more of the enzymes in the combination, especially neutral protease which is extremely subject to inactivation by autodigestion or attack by other enzymes, but also the creation of objectionable odors and tastes due to such autodigestion. Such objections apply especially where an alkaline or acid protease and neutral protease are both present in an enzyme mixture, and any such mere enzyme combination would be and is subject to the stated objections and disadvantages for the reasons given.

SUMMARY OF THE INVENTION

The present invention relates to polymer-enzyme products comprising a plurality of enzymes covalently bound to a polymer chain, the plurality of enzymes including one or more proteases, preferably both a neutral protease and an alkaline protease, and optimally also a third enzyme, such as amylase or lipase, thereby to extend the range of activity even further. These products have been prepared and found to be stable, long-acting, reusable when in insoluble or soluble form, and to have the desired wide range of applicability due to their increased range of enzymatic activity as in detergent compositions and the like. They are substantially odorless and colorless and are not subject to autogenous deterioration due to their presence in the polymeric product in a covalently bound state as opposed to a noncovalently bound state, e.g., by adsorption or the like, which would be undesirable due to the fugitive nature of such bond and the possibility of detachment due to reversibility of the process.

Objects

The provision of novel polymer-plural enzyme products of the aforementioned type having any or all of the aforementioned advantages is one object of the present invention. The provision of a process for the production of such novel polymer-plural enzyme products of the aforementioned type is another object of the invention.

Other objects will become apparent hereinafter and still others will be obvious to one skilled in the art.

GENERAL DESCRIPTION OF THE INVENTION

The invention, then, involves a polymer-plural enzyme product, wherein the enzymes are covalently bound, comprising one or more proteolytic enzymes, preferably both a neutral protease and an alkaline protease, and optimally also an additional enzyme, e.g., amylase or lipase, to further increase the range of enzymatic activity of the product.

The polymer is preferably one containing a free carboxyl or carboxylic anhydride group adapted to effect covalent bonding with the enzymes either directly or through activation of a carboxyl group thereof. The polymer may be of relatively low molecular weight and non-crosslinked when water-soluble products are desired, or it may be of higher molecular weight and itself water insoluble where a water-insoluble product is desired. As will be obvious, these different types of products will have their own specific fields of application, as in detergents where soluble and in the food and brewing fields where insoluble. Also, whether soluble or insoluble, they have application in the digestion of organic materials such as sewage or conversion of waste materials and low-grade protein e.g., fish, to fertilizer materials. Numerous fields of application for enzymes are already established and the products of the invention find ready application in all such fields, especially because of their stability, and both diverse and wide range of enzymatic effectiveness. As either soluble or insoluble products, they are in many cases recoverable for reuse. In any case, they are relatively stable and long-acting in effect.

Definitions

"EMA" is a polymer of ethylene and maleic anhydride. Polymers of this type are of great value according to the present invention.

"EMA-type" polymer is defined hereinafter.

"EMA-enzyme" or "EMA/enzyme" is a copolymer of ethylene and maleic anhydride having enzyme covalently bonded thereto. The product is the same whether the enzyme is reacted directly with an anhydride group of the ethylene-maleic anhydride copolymer or with a carboxyl group of the ethylene-maleic anhydride copolymer, whether or not using an intermediate activating mechanism for carboxyl groups of the polymer. Anhydride groups not participating in the reaction by which the product is produced in aqueous medium are present in the product as carboxyl or carboxylate groups. Such nonparticipating groups may, however, be converted to amide, imide, ester, et cetera, groups, as may be present in EMA-type polymers, as hereinafter defined.

"Water-insoluble" means that the product concerned does not dissolve in water or aqueous solutions, although it may have such characteristics as a high degree of swelling due to water solvation, even to the extent of existence in gel form.

"Water-soluble" means not water-insoluble, and is further defined hereinafter.

Process

Polymer-plural enzyme derivatives can be prepared by reacting the crystalline or crude plurality of enzymes or enzyme mixtures with the polymer in solution, resulting in formation of a polymeric product in which the enzymes are covalently bound.

The reaction of the polymer with the plurality of enzymes, as in the examples, can obviously be carried out stepwise, one enzyme at a time, with or without intermediate isolation, or with all enzymes at once. The latter procedure is preferred for reasons of time, convenience and economy.

When an anhydride or carboxyl is present in the polymer, e.g., an EMA-type polymer, covalent bonding of the enzyme to the polymer may be effected directly through reaction or coupling with an anhydride group or with a carboxyl group using an activating agent. The product is the same in both cases. The pH range for the reaction depends on the enzymes employed and their stability ranges. It is usually about 5 to 9.5, preferably about 6–8, but adjustment must be made for individual cases. Isolation and purification is generally effected according to normal biochemical procedures, and by the general procedure of the examples which follow. Since covalent bonding of the enzyme to the polymer is desired, the reaction is ordinarily carried out at low temperatures and at relatively neutral pH's, in water or dilute aqueous buffer as solvent.

When carried out in this manner, the results are production of the desired active polymer-plural enzyme derivative, but degree of activity imparted to the polymeric product is sometimes lower than desired, possibly due to partial inactivation of the enzyme during the process. Resort may frequently advantageously be had to employment of a mixed solvent system, using a solvent in which the enzyme is at least partially soluble, usually in an amount up to about 50 percent by volume. Dimethylsulfoxide (DMSO) is especially suitable as solvent together with water or aqueous buffer solution in a mixed solvent system. Using such a mixed solvent system, the desired active polymer-plural enzyme product is ordinarily obtained in higher yields and conversions to desirably active product, and introduction of desirably high amounts of enzyme activity into the polymer molecule is generally less difficult.

As far as the polymer in such reaction, it preferably contains carboxyl or anhydride linkages, especially where the enzyme contains an amino, hydroxyl (including phenolic hydroxyl,) or sulfhydryl group not essential for its enzymatic activity. Where the enzyme contains a carboxyl group not essential for activity, the polymer can contain free hydroxyl or amine groups for reaction therewith. The polymer is preferably EMA or an EMA-type polymer, but it can be any of those types previously disclosed for coupling or reaction with an enzyme, and in any event it is adapted to effect covalent bonding with the enzyme to produce an enzyme-polymer product either directly or indirectly using an activating agent. Inasmuch as the enzymatic activity of the starting enzyme is desired to be retained in the final product, it is of course firstly necessary that bonding of the enzyme to the polymer be through a group which will not result in inactivation of an active site in the enzyme molecule. Among the various reactive groups of enzyme molecules may be mentioned, besides amino and sulfhydryl, also hydroxyl (including phenolic, hydroxyl,) carboxyl and imidazolyl. Such groups are present in free or unbound form in inactive portions of enzyme molecules, as in a lysine, cysteine, serine, threonine, histidine, or tyrosine moiety of an enzyme molecule, where the particular moiety in question is not considered essential for enzymatic activity, either catalytic in nature or for substrate binding. Therefore, attachment to the polymer molecule is through reaction of the polymer with such groups so as to avoid inactivation of the enzymes during attachment to the polymer molecule. Generally, the linkage is an amide, imide, ester, thioester, or disulfide group, such as formed by the carboxyl or anhydride of the polymer with an amine or hydroxyl group in a nonessential moiety of the enzyme protein chain. Amides are conveniently formed by reacting pendant amino groups of the enzyme with carboxylic anhydride groups on the carrier polymer in water, in aqueous buffer media, or in mixed solvents. Amides, imides and esters are readily formed by activating carboxyl groups of the polymer, or alternatively pendant carboxyls of the enzyme, and reacting them with respective hydroxyl, amine or mercaptan groups on the other reactant. Such activation may be effected using various carbodiimides, carbodiimidazoles, Woodward's or Sheehan's reagent, or the like, to form highly active intermediates capable of reacting with other groups mentioned above under mild conditions, the latter favoring retention of enzymatic activity.

The polymer selected for such reaction can therefore be said to be adapted to couple or react with the plurality of enzymes, either directly or indirectly through use of an activating agent, as already indicated, and in any event to effect covalent bonding with the enzymes. The attachment procedures given are conducted by techniques adapted to include any requisite protection for the enzyme, which may include a reversible blocking of the enzymatically active site or sites, as for example in the case of papain, where mercuripapain or zinc papain may be employed as an intermediate for reaction with the polymer in order to effect greater yields upon attachment, the protecting atoms being removed subsequent to the attachment reaction.

ENZYMES

The enzyme starting material may be obtained from any suitable source, whether vegetable, animal, or microbial. Many are available commercially. In addition to the necessary protease, e.g., acid and/or neutral and/or alkaline protease, another differently active enzyme is also preferred for maximum operative enzymatic activity. An amylase is preferred, but a lipase or cellulase may be used instead of or in addition to the amylase. A carbohydrase, lipase, esterase, nuclease, or other type of hydrolase may be an additional enzyme reactant. A hydrase, oxidoreductase, or demolase may also be employed, or a transferase or isomerase, depending upon the ultimate activity and application intended. At any rate, an alkaline, neutral, or acid protease, and preferably both a neutral protease and an alkaline protease, will be present, covalently bound in the polymer-plural enzyme molecule.

Many such enzymes can conveniently be obtained from micro-organisms which include bacteria, yeasts, fungi and the like by using well-known fermentation methods such as those generally described in KIRK-OTHMER, Encyclopedia of Chemical Technology 8, 173-204, and a great many microbially-produced enzymes are available commercially.

The exact activity of the enzyme or enzymes employed as starting material depends on the exact method of preparation and is not critical to the present invention providing only that the enzymatically active polymer-enzyme product produced therefrom has the desired plural enzymatic activity. Various analytical methods are available to determine the activity of enzymatically active material, for example, the protease activity of proteolytic enzymes can be determined by well-known casein digestion methods. According to such tests, a protease catalyzes the hydrolysis of casein for a certain period of time and temperature and at a certain pH; the reaction is stopped by the addition of trichloroacetic acid, and the solution is filtered. The color of the filtrate is developed by Folin phenol reagent, and the level of enzyme activity is measured spectrophotometrically in units of casein tyrosine. This method is more fully described in the Journal of General Physiology 30, 291 (1947) and in Methods of Enzymology 2, 33 by Academic Press N.Y. (1955.) Amylase activity is generally determined by the well-known dinitrosalicylic acid method of Bernfeld. Still other test procedures are known in the art and some are set forth hereinafter.

A particularly effective source of mixed enzymes which can be used as starting material in the present invention is a mutated *Bacillus subtilis* organism. The process for producing this organism and enzymes therefrom is described in U.S. Pat. No. 3,031,380. A culture of this *Bacillus subtilis* (strain AM) organism has been deposited with the United States Department of Agriculture, Agricultural Research Service, Northern Utilization Research and Development Division, 1815 North University Street, Peoria, Ill. 61604, and has been assigned No. NRRL B-3411. The enzymatically active material produced by this organism has been found generally to consist of two proteases, approximately 65-75 percent neutral protease (activity at a pH of 7.0-7.5) and about 25-35 percent alkaline protease (activity at a pH of 9 to 10). A significant amount of amylase is also present. There are generally about 700 thousand to about 1.2 million units of neutral protease activity per gram of isolated solids and about 250 thousand to about 400 thousand units of alkaline protease activity per gram as determined by Anson's Variation of the Kunitz-Casein method. There are generally about 300 thousand to 350 thousand units of amylase activity per gram as determined by the Bernfeld method. As pointed out in the cited patent, the relative proportions of protease to amylase will vary depending on the exact conditions of growth of the micro-organism, but we have found that the neutral and alkaline protease and the amylase will be produced, in at least some amounts, almost regardless of changes in the culture medium and other conditions of growth of the micro-organism. The ratio of the activity of the alkaline protease to the activity of the neutral protease in the starting materials and in the polymer-enzyme product is preferably about 0.25–1.2 to 1.

Another source of mixed enzymes which can be used as starting material in accord with the present invention is *B. subtilis* strain e.g., 644, *B. subtilis* strain NRRL 941, and *B. subtilis* strain IAM 1523 (Japanese Culture Collection.) Still other *B. subtilis* micro-organisms are available which produce protease, a mixture of proteases, or protease and amylase, at least to a limited if not optimum extent. The so-called *Streptomyces griseus* neutral protease has a broad pH activity range and may constitute one starting enzyme for incorporation into the products of the invention.

POLYMERIC REACTANT-CROSSLINKING-WATER-INSOLUBILITY/SOLUBILITY

In its broadest context, the polymer to which the plurality of enzymes are to be attached according to one or more aspects of the invention contains carboxyl or anhydride linkages, especially where the enzymes contain an amino, hydroxyl, or sulfhydryl group not essential for their enzymatic activity. Where an enzyme contains a carboxyl group not essential for activity, the polymer can contain hydroxyl or amine groups for reaction therewith. The polymer may be EMA or an EMA-type polymer, or be any of those types previously disclosed for coupling or reaction with an enzyme, and in any event it is adapted to couple or react with the enzymes to effect covalent bonding and production of the desired plural enzyme-polymer product.

Since covalent bonding is desired, it is understood that the carrier polymer is tailored to contain at least one reactive site for each polymer molecule with which the enzymes can react, either directly or indirectly, to produce a covalent bond. According to the invention, this reactive site (or sites) is preferably a carboxyl or carboxylic anhydride group.

The product of the invention thus comprises enzymes, including at least one protease and preferably a plurality of proteases, bound covalently through groups which are nonessential for enzymatic activity to a polymer (a) comprising chains of carboxylic acid or carboxylic acid anhydride units, said polymer chains being formed by polymerization of polymerizable acids or anhydrides, or (b) comprising units of carboxylic acid or carboxylic acid anhydride groups separated by carbon chains of at least one and not more than four carbon atoms, said carbon chains being part of a unit which contains a maximum of 18 carbon atoms, said chains usually being formed by copolymerizing a polymerizable acid or anhydride with another copolymerizable monomer, and preferably wherein the starting acid or anhydride and any additional copolymerizable monomer are unsaturated and such polymerization or copolymerization comprises addition type polymerization or copolymerization involving such unsaturation.

The polymeric reactant is thus preferably defined broadly as follows: a polymer (a) comprising chains of carboxylic acid or carboxylic acid anhydride units, said polymer being formed by polymerization of polymerizable acids or anhydrides, or (b) comprising units of carboxylic acid or carboxylic acid anhydride groups separated by carbon chains of at least one and not more than four carbon atoms, said carbon chains being part of a unit which contains a maximum of 18 carbon atoms, said chains usually being formed by copolymerizing a polymerizable acid or anhydride with another copolymerizable monomer, and preferably wherein the starting acid or anhydride and any additional copolymerizable monomer are unsaturated and such polymerization or copolymerization comprises addition type polymerization or copolymerization involving such unsaturation.

Among such polymers, polyelectrolytes having units of the formula

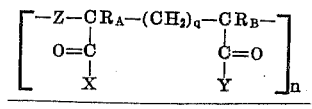

wherein: $R_A$ and $R_B$ are selected from the group consisting of hydrogen, halogen (preferably chlorine,) alkyl of one to four carbon atoms (preferably methyl,) cyano, phenyl, or mixtures thereof; provided that not more than one of $R_A$ and $R_B$ is phenyl; Z is a bivalent radical (preferably alkylene, phenylalkylene, lower-alkoxyalkylene, and lower-aliphatic acyloxyalkylene) comprising a carbon chain having one to four carbon atoms, inclusive, said carbon chain being part of a unit which contains one to 18 carbon atoms inclusive, $q$ is 0 or 1, X and Y are selected from hydroxy, —O alkali metal, OR, —$ONH_4$, —$ONHR_3$, —$ONH_2R_2$, —$ONH_3R$, —NRR', —$(Q)_p$—W—$(NR'R')_x$, and —$(Q)_p$—W—$(OH)_x$, wherein $x$ is 1 to 4 and $p$ is 0 or 1, wherein R is selected from the group consisting of alkyl, phenylalkyl, or phenyl, in each case of one to 18 carbon atoms, wherein R' is H or R, wherein Q is oxygen or —NR'—, and wherein W is a bivalent radical preferably selected from lower-alkylene, phenyl, phenylalkyl, phenylalkylphenyl, and alkylphenylalkyl having up to 20 carbon atoms, X and Y taken together can be an oxygen atom, and at least 1 of X and Y being hydroxyl or X and Y together constituting an oxygen atom, are preferred. Many of these polymers are commercially available and others are simple derivatives of commercially available products, which can be readily prepared either prior to or simultaneously with the enzyme attachment reaction, or produced as a minor modification of the basic polymer after attachment. Such polymers containing the above-described EMA-type units are hereinafter referred to as an EMA-type polymer.

Since enzyme molecules have an extremely high molecular weight, even if the polymeric units exemplified as usable for attachment of the enzyme occurs only once in a polymer chain, for example, once in every several hundred units, reaction of the enzyme with this unit will result in an enzyme-polymer product having substantial enzymatic activity and one wherein the enzyme moiety constitutes a substantial portion of the molecular weight of the polymeric enzyme product. If more than one of the exemplified units is present, multiple attachments can be achieved with increased enzymatic activity of the product. As pointed out hereinafter, preferably the units of the formula given are recurring, n being at least 8. When the units are recurring, the symbols in the various recurring units do not necessarily stand for the same thing in all of the recurring units. Moreover, where the units are recurring, some of the X and Y groups may have meanings besides hydroxy or oxygen. For example, some, but not all, of them may be present in the form of imide groups, that is, groups in which X and Y together are —NR— or —N—W—$(NR'R')_x$ wherein R, W and R' have the values previously assigned.

A preferred type of polymeric material useful in the practice of the invention is the polymer of an olefinically unsaturated polycarboxylic acid or derivative with itself or in approximately equimolar proportions with at least one other monomer copolymerizable therewith. The polycarboxylic acid derivative can be of the nonvicinal type, including acrylic acid, acrylic anhydride, methacrylic acid, crotonic acid or their respective derivatives, including partial salts, amides and esters or of the vicinal type, including maleic, itaconic, citraconic,α,αimethyl maleic, α-butyl maleic,α-phenyl maleic, fumaric, aconitic,α-chloromaleic,α-bromomaleic,α-cyanomaleic acids including their partial salts, amides and esters. Anhydrides of any of the foregoing acids are advantageously employed.

Co-monomers suitable for use with the above functional monomers include α-olefins such as ethylene, propylene, isobutylene, 1- or 2-butene, 1-hexene, 1-octene, 1-decene, 1-dodecene, 1-octadecene, and other vinyl monomers such as styrene, α-methyl styrene, vinyl toluene, vinyl propionate, vinyl amine, vinyl chloride, vinyl formate, vinyl acetate, vinyl alkyl ethers, e.g., methylvinylether, alkyl acrylates, alkyl methacrylates, acrylamides and alkylacrylamides, or mixtures of these monomers. Reactivity of some functional groups in the copolymers resulting from some of these monomers permits formation of other useful functional groups in the formed copolymer, including hydroxy, lactone, amine and lactam groups.

Any of the said polybasic acid derivatives may be copolymerized with any of the other monomers described above, and any other monomer which forms a copolymer dibasic acid derivatives. The polybasic acid derivatives can be copolymers with a plurality of comonomers, in which case the total amount of the comonomers will preferably be about equimolar with respect to the polybasic acid derivatives. Although these copolymers can be prepared by direct polymerization of the various monomers, frequently they are more easily prepared by an after-reaction modification of an existing copolymer.

Copolymers of anhydrides and another monomer can be converted to carboxyl-containing copolymers by reaction with water, and to ammonium, alkali and alkaline earth metal and alkylamine salts thereof by reaction with alkali metal compounds, alkaline earth metal compounds, amines, or ammonia, etc., either prior to, during, or subsequent to enzyme attachment. Other suitable derivatives of the above polymers include the partial alkyl or other esters and partial amides, alkyl amides, dialkyl amides, phenylalkyl amides or phenyl amides prepared by reacting carboxyl groups on the polymer chain with the selected amines or alkyl or phenylalkyl alcohol as well as amino esters, amino amides, hydroxy amides and hydroxy esters, wherein the functional groups are separated by lower-alkylene, phenyl, phenylalkyl, phenylalkylphenyl, or alkylphenylalkyl, which are prepared in the same manner in each case with due consideration of preservation of enzyme attachment sites as previously stated. Other aryl groups may be present in place of phenyl groups. Particularly useful derivatives are those in which negatively charged carboxyl groups are partially replaced with amine or amine salt groups. These are formed by reaction of said carboxyls with polyamines such as dimethylaminopropylamine or dialkylaminoalcohols such as dimethylaminoethanol, the former forming an amide linkage with the polymer and the latter an ester linkage. Suitable selection of the above derivatives permit control of several parameters of performance for the enzyme-polymer products of the invention.

Representative dibasic acid or anhydride-olefin polymers, especially maleic acid or anhydride-olefin polymers, of the foregoing type (EMA-type) are known, for example, from U.S. Pat. Nos. 2,378,629, 2,396,785, 3,157,595 and 3,340,680. Generally, the copolymers are prepared by reacting ethylene or other unsaturated monomer or mixtures thereof, as previously described, with the acid anhydride in the presence of a peroxide catalyst in an aliphatic or aromatic hydrocarbon solvent for the monomers but nonsolvent for the interpolymer formed. Suitable solvents include benzene, toluene, xylene, chlorinated benzene and the like. While benzoyl peroxide is usually the preferred catalyst, other peroxides such as acetyl peroxide, butyryl peroxide, ditertiary butyl peroxide, lauroyl peroxide and the like, or any of the numerous azocatalysts, are satisfactory since they are soluble in organic solvents. The copolymer preferably contains substantially equimolar quantities of the olefin residue and the anhydride residue. Generally, it will have a degree of polymerization of 8 to 10,000, preferably about 100 to 5,000, and a molecular weight of about 1,000 to 1,000,000, preferably about 10,000 to 500,000. The properties of the polymer, such as molecular weight, for example, are regulated by proper choice of the catalyst and control of one or more of the variables such as ratio of reactants, temperature, and catalyst concentration or the addition of regulating chain transfer agents, such as diisopropyl benzene, propionic acid, alkyl aldehydes, or the like. The product is obtained in solid form and is recovered by filtration, centrifugation or the like. Removal of any residual or adherent solvent can be effected by evaporation using moderate heating. Numerous of these polymers are commercially available. Particularly valuable copolymers are those derived from ethylene and maleic anhydride in approximately equimolar proportions. The product is commercially available.

The maleic anhydride copolymers thus obtained have repeating anhydride linkages in the molecule, which are readily hydrolyzed by water to yield the acid form of the copolymer, rate of hydrolysis being proportional to temperature. In view of the fact that attachment reactions of the present invention are carried out in aqueous solutions or suspensions, or using water-solvent mixtures, the product of the said reaction or coupling of the enzyme to EMA has carboxyl or carboxylate groups attached to its chains adjacent the attached enzyme instead of anhydride groups, due to hydrolysis of the anhydride groups, which do not react with the enzymes, during the reaction. The same is true of nonreacting anhydride groups present in other polymers, such as EMA-type polymers, which hydrolyze to carboxyl or carboxylate groups during the reaction.

The term water-insoluble, as already stated, when applied means that the product concerned does not dissolve in water or aqueous solutions, even though it may have such characteristics as a high degree of swelling due to solvation by water, even to the extent of existence in a gel form. Water-insoluble products can be separated by methods including filtration, centrifugation, or sedimentation. Such characteristics are imparted by cross-linking.

The term water-soluble, when applied, means that the product concerned dissolves in water or aqueous solutions. As usual, however, this does not mean that the product dissolves completely at all concentrations or at all pHs. On the other hand, these water-soluble products are characterized by being soluble at a variety of concentrations and pHs, and they are generally soluble at pHs of 7 or greater. In their soluble form, the polymer-enzyme products of the invention are characterized by the same general enzymatic activity as the parent native enzyme, but have all of the advantages which are attendant upon applicability in solution or suspension form together with increased stability and prolonged activity. In addition, because of their polymeric form, even though soluble, the polymer-enzyme products of the invention are separable from native enzyme or substrates, as well as impurities and coloring matter of an undesired nature, by normal separation procedures such as centrifugation, electrophoresis, or chromatography.

Thus, water-insoluble plural enzyme-polymer products, according to the invention, are produced by reacting the enzymes with a water-insoluble polymer or by causing the reaction product of the enzymes and polymer to become insoluble either by reaction with a polyfunctional cross-linking agent, such as a polyamine or polyol (including glycol,) when this is necessary. The plural enzyme-polymer product is frequently at least in part insoluble per se because of interaction between the enzyme moiety and additional polymer chains. If the polymer is precross-linked so as to have a three-dimensional structure or, in some cases, has a sufficiently long linear chain length, the starting polymer is already water-insoluble. Other methods of cross-linking exist and are well known in the art. Further detailed description follows.

Insolubilization via cross-linking can be introduced at any of three stages in the preparation of products of this invention:

1. The carrier polymer may be cross-linked prior to attachment of the enzyme by any of several procedures well known in the art of polymer reactions (e.g., incorporation of multifunctional unsaturated monomers during preparation of the polymer or subsequent reaction of the polymer with a few mole percent of multifunctional amines, glycols, etc.)

2. Multifunctional amines, glycols, etc., can be added concurrently with the enzyme in the enzyme-attachment step.
3. A multifunctional cross-linking agent may be added to the product after the enzyme has been attached. Such cross-linking agents are added in controllable amounts sufficient to insolubilize the product.

In addition, the enzyme reactant to be attached, e.g., coupled, to the polymer is commonly multifunctional in itself and thus contributes to the three-dimensional network character of the product. In fact, in many cases, the insolubilization effected in this manner alone is sufficient to impart insoluble characteristics to the product without use of additional cross-linking agents.

When markedly insoluble products are the objective, it is often advantageous to employ copolymers which already contain some cross-linking. Such cross-linked copolymers are known and are obtainable by conducting the polymerization, e.g., the copolymerization of maleic anhydride and hydrocarbon olefin, in the presence of a cross-linking agent, e.g., a compound containing two olefinic double bonds, such as divinylbenzene or vinyl-crotonate, poly-1,2-butadiene or alpha, omega-diolefins. The quantity of cross-linking agent will vary with the degree of insolubility desired, but generally will be on the order of from 0.1 percent to 10 percent by weight of the total monomer mixture.

As one example of procedure for preparation of the three-dimension polymer network, where necessary or desirable, a difunctional compound can be used for cross-linking a preformed dibasic acid/$C_2$—$C_{18}$ mono-olefin copolymer. This can be achieved by reaction between the copolymer and a polyamine, e.g., from 0.1 to 10 mole percent of ethylenediamine. Thus, the quantity of cross-linking of the overall polymer can be controlled. It is understood that ethylenediamine is a typical example of a cross-linking reagent, but many other compounds, such as the group of alkylene and other similar polyamines, can be used for this purpose. Soluble enzyme-polymer products, on the other hand, can advantageously be produced by somewhat different operating procedure.

General Procedure for Solubles Preparation

In order to achieve high yields of water-soluble plural enzyme-polymer products, it is desirable to avoid cross-linking which results in insolubilization.

To prepare soluble plural enzyme-polymer derivatives, therefore, the reaction is preferably performed under substantially noncross-linking conditions. The undesired cross-linking can be reduced by performing the attachment reaction in high dilution such that fewer reactions occur between several polymer molecules and a single enzyme molecule. Alternatively, high ratios of enzyme to polymer favor reaction of several enzyme molecules with a single polymer molecule. This, therefore, results in a agglomerated enzyme/polymer system which maintains the desired soluble properties of the individual enzyme molecules. While such procedures as described above are often desirable, it is not always necessary to use dilute solutions or high enzyme/polymer ratios to cause formation of soluble plural enzyme/polymer derivatives.

DESCRIPTION OF THE PREFERRED EMBODIMENTS

The following Examples are given by way of illustration only, and are not to be construed as limiting.

EXPERIMENTAL

The general procedure employed consisted of allowing cold solutions of enzymes in appropriate buffers to react overnight at 4° C. with cold, homogenized polymer, e.g., EMA, suspensions. EMA-21 was preferably employed, which had a molecular weight of ca. 20–30,000. Other molecular weight polymers may also be used. For example, EMA 11, having a molecular weight of about 2–3,000, and EMA 31, having a molecular weight of about 60,000, may also be employed. Separation of soluble and insoluble adducts, after reaction, was achieved by centrifugation in the cold (Sorval SS-3 (TM) centrifuge, ca. 10,000 r.p.m. and 10 min. centrifugation time.) The soluble adducts were exhaustively dialyzed against water in the cold and then lyophilized. Insoluble adducts were washed (and centrifuged,) usually 10 times with cold buffer and 5 times with cold distilled water and then lyophilized.

EXAMPLES 1-11

EMA-Neutral Protease, Alkaline Protease, and Amylase Polymeric Products

Experimental

The reactants utilized in the production of the *Bacillus subtilis* enzyme mixture/EMA-21 adduct were prepared to the following requirements:
1. Anhydrous EMA-21 was prepared from HEMA-21 (hydrolyzed EMA) by heating in vacuum at a temperature of 105° C. overnight. The molecular weight of EMA-21 is approximately 20–30,000.
2. The veronal buffer utilized was 0.05 M with a pH of 7.8.
3. The calcium acetate solution employed was 1 M. This was added in twice the volume in order to bring the enzyme solution to the required calcium ion concentration. Alternatively, a 2 M concentration solution was employed.

Different samples of *Bacillus subtilis* AM enzyme mixture, each containing neutral protease, alkaline protease, and amylase, were employed. The material was of three types as follows:
1. *B. subtilis* strain AM enzyme mixture with an activity of $1.9 \times 10^6$ protease $\mu$/g. (pH 7) and partly insoluble.
2. *B. subtilis* strain AM enzyme mixture with an activity of $1.0 \times 10^6$ protease $\mu$/g. (pH 7) and partly insoluble.
3. *B. subtilis* strain AM enzyme mixture with an activity of $1.43 \times 10^6$ protease $\mu$/g. (pH 7) and completely soluble.

A. ATTACHMENT

The general procedure is illustrated as follows: The crude *B. subtilis* enzyme mixture is suspended in cold distilled water and stirred magnetically for one hour at 4° C. The resulting mixture is then centrifuged at 8,000 r.p.m. for 10 minutes to remove suspended and inactive solids. (This step is omitted for the completely soluble enzyme system, No. SG-2144). The supernatant is separated and made 0.065 M in calcium ion by the addition of 1 M Ca(OAc)$_2$ and the solution is then stirred for 30 minutes in the cold (4° C.). The mixture is then centrifuged at 8,000 r.p.m. for 10 minutes to remove precipitated and inactive solids. To the clarified supernatant there is added, with stirring, cold 0.05 M veronal buffer, pH 7.8. While the above solutions are being prepared an appropriate quantity of EMA (*B. subtilis* enzymes: EMA-21, 8:1 w/w) is dissolved in dimethylsulfoxide. This solution is added dropwise to the stirred, cold enzyme solution (vide supra) and the mixture is then stirred overnight at 4° C. The mixture is then centrifuged at 8,000 r.p.m. for 10 minutes and the solid product is collected. The solid adduct is washed using twice its volume of cold, distilled water, with stirring and centrifugation. The adducts were washed in this manner 15 times and the product was then isolated by lyophilization. Yields and enzymatic activities of the adduct preparations are recorded in table I.

The yield of insoluble products is advantageously achieved, when desired, by performing the reaction in the presence of a cross-linking agent such as hexamethylene-diamine, e.g., at a 1 to 2 percent concentration relative to the amount of polymer employed.

TABLE I

| Example Number | B. Subtilis enzyme mixture number | Original protease activity ($10^6$ μ/g.) | Amount of B. Subtilis enzyme mixture (g.) | B. Subtilis enzyme mixture/ EMA ratio | Recovered protease activity (μ/g.) | Recovered adduct (g.) | Activity retained (percent) | Weight recovered (percent) |
|---|---|---|---|---|---|---|---|---|
| 1 | R.G.A. | 6.0 | 3 | 8:1 | 3,045,000 | 0.780 | 50.7 | 26.0 |
| 2 | SG-2046 | 1.9 | 20 | 8:1 | 1,400,000 | 5.493 | 73.7 | 27.5 |
| 3 | SG-2046 | 1.9 | 20 | 8:1 | 1,050,000 | 5.260 | 55.2 | 26.3 |
| 4 | SG-2046 | 1.9 | 20 | 8:1 | 1,515,000 | 4.962 | 79.7 | 24.8 |
| 5 | SG-2046 | 1.9 | 150 | 8:1 | 1,400,000 | 52.70 | 73.7 | 35.1 |
| 6 | SG-2046 | 1.9 | 55 | 8:1 | 670,000 | 11.10 | 35.2 | 20.0 |
| 7 | SG-2046 | 1.9 | 55 | 8:1 | 288,000 | 12.90 | 43.0 | 23.4 |
| 8 | SG-2046 | 1.9 | ¹750 | 8:1 | 1,312,500 | 0.163 | 68.9 | 21.7 |
| 9 | SG-2089 | 1.0 | 55 | 8:1 | 375,000 | 119.2 | 37.5 | 30.9 |
| 10 | SG-2144 | 1.4 | *4×55 | 8:1 | 1,250,000 | 70.0 | 87.3 | 31.8 |
| 11 | SG-2144 | 1.4 | **9×55 | 8:1 | 650,000 | 400 | 45.4 | 46.0 |

¹ Milligrams.
* Combining of four 55 gram runs.
** Combining of nine 55 gram runs.

ASSAYS

Amylase assays were performed, using the established Bernfeld procedure, with a 5-minute heating for color development.

Protease assays at pH 7 were performed by the established Anson procedure; assays at pH 10 differed only in that the solution of casein was neutralized to pH 10 with dilute phosphoric acid.

STABILITY STUDIES

Stability studies on the components of the B. subtilis AM enzyme mixture (amylase, protease assayed at pH 7.0 and pH 10.0) and on the insoluble EMA derivative thereof were carried out at 25°, 37° and 50° C. over periods up to 22 days. The effect of added calcium was more noticeable on the stability of the EMA-enzyme derivative, possible due to removal of endogenous calcium during the preparation. The amylase activity was fairly stable and was increased at pH 8–10 in the EMA-enzyme derivative. A similar effect was observed with the total protease activity (assayed at pH 7.0) and alkaline protease (assayed at pH 10.0) in the long term studies at pH 7–10 at 25° and 37°. In the higher temperature stability study (up to 80°) with only 30-minute heating, the increased stability of the EMA-enzyme derivative amylase activity at higher pHs was well demonstrated. The protease does not show a corresponding tremendously-increased thermal stability, although the stability of the neutral protease in the EMA adduct was itself about twice that of the native enzyme and stability of the alkaline protease in the EMA adduct form was about four times that of the native enzyme after 30 minutes at 80° C.

PROPERTIES AND CHARACTERIZATION

Positive proof that all three types of enzymes are present in the polymeric molecule is provided by the following:

1. The EMA-plural enzyme product has amylase activity with a specific activity almost as high as the two unattached enzyme mixtures used as controls, as shown in Table II.
2. The EMA-plural enzyme product has protease activity at pH 7 and pH 10 in approximately the same ratio as exists between the unattached enzyme mixtures used as control. The specific activity of the EMA-plural enzyme product at the two pH's at which tested is, moreover, almost identical to values found for the two control enzyme mixtures, also as shown in table II.

TABLE II

|  | Amylase μ/g. | Protease (neutral) pH 7.0 μ/g. | Protease (alkaline) pH 10.0 μ/g. |
|---|---|---|---|
| Insoluble EMA-plural enzyme product | 405,000 | 1,090,000 | 680,000 |
| Enzyme A | 666,000 | 1,720,000 | 990,000 |
| Enzyme B | 340,000 | 960,000 | 550,000 |

Stability studies showed an unpredictably high stability for the polymer-enzyme products, as shown in Tables III-VIII.

TABLE III

The Effect of Attachment to EMA on B. subtilis Amylase Stability

Period of heating 30 minutes, pH 10.0

| Temp. | 25° C. | 50° | 60° | 70° | 80° |
|---|---|---|---|---|---|
| Insoluble EMA-plural enzyme product | (100) | 104 | 100 | 70 | 16 |
| Control Enzyme | (100) | 99 | 85 | 43 | 2 |

TABLE IV

The Effect of Attachment to EMA on B. subtilis Neutral Protease Stability

Period of heating 30 minutes, pH 8.0

Protease assay at pH 10.0

| Temp. | 25° C. | 50° | 60° | 70° | 80° |
|---|---|---|---|---|---|
| Insoluble EMA-plural enzyme product | (100) | 92 | 63 | 19 | 11 |
| Control Enzyme | (100) | 79 | 54 | 12 | 6 |

TABLE V

The Stability of Alkaline Protease and its EMA Derivatives at pH 10.0

Period of heating 30 minutes; assay at pH 10.0

| Temp. | 25° C. | 50° | 60° | 70° | 80° |
|---|---|---|---|---|---|
| Insoluble EMA-plural enzyme product | (100) | 70 | 52 | 35 | 13 |
| Control Enzyme | (100) | 68 | 49 | 8 | 3 |

TABLE VI

The Effect of EMA Attachment on Stability of B. subtilis Neutral Protease

Temp. 25° C.; pH 9.0; assay at pH 7.0 in 0.1% $CaAc_2$

| Time (hours) | 0 | 22 | 46 | 70 | 166 | 238 |
|---|---|---|---|---|---|---|
| Insoluble EMA-plural enzyme product | (100) | 67 | 28 | 28 | 27 | 23 |
| Control Enzyme | (100) | 28 | 15 | 20 | 14 | 2 |

TABLE VII

The Effect of Attachment to EMA on Stability of B. subtilis Alkaline Protease Temp. 25° C.; pH 7.0 in 0.1% $CaAc_2$; Assay at pH 10.0

| Time (hours) | 0 | 22 | 46 | 94 | 166 |
|---|---|---|---|---|---|
| Insoluble EMA-plural enzyme product | (100) | 90 | 100 | 90 | 92 |
| Control Enzyme | (100) | 83 | 71 | 17 | 4 |

TABLE VIII

The Effect of Attachment to EMA on Stability of B. subtilis Alkaline Protease Temp. 50° C.; pH 10.0 in 0.1% $CaAc_2$; Assay at pH 10.0

| Time (hours) | 0 | 22 | 46 | 94 | 166 | 190 | 214 |
|---|---|---|---|---|---|---|---|
| Insoluble EMA-plural enzyme product | (100) | 62 | 27 | 23 | 19 | 12 | 12 |
| Control Enzyme | (100) | 22 | 9 | 3 | 2 | 6 | 1 |

EXAMPLE 12

Plural Protease/EMA Insoluble and Soluble Adducts.

B. subtilis alkaline and neutral proteases (200 mg.) are dissolved in 50 ml. cold 0.1 M in phosphate and 0.01 M in calcium acetate, pH 7.5, and this solution is then added to a cold, homogenized mixture of EMA-21 (100 mg.) suspended in 50 ml. 0.1 M phosphate, pH 7.5. The mixture is stirred overnight in the cold (4° C.) and the insoluble material is separated from the supernatant by centrifugation. After washing the solids five times with cold 0.1 M NaCl and twice with water, the material is lyophilized to yield a solid which possesses 38 percent of neutral protease activity and 52 percent of the original alkaline protease activity.

The supernatant solution is dialyzed against cold, distilled water and then lyophilized to yield a soluble solid which possesses 47 percent of the neutral protease activity and 59 percent of the original alkaline protease activity.

Employment of 1 percent hexamethylenediamine increases the amount of insoluble cross-linked product.

The same result is obtained when the acid protease from A. oryzae is added to the starting reactants. The product, containing the acid protease in addition to the neutral and alkaline proteases, has a wider range of proteolytic activity, especially in lower pH ranges. The percentage of proteolytic activities, contrasted with the respective native enzymes, are about 42 percent acid, 30 percent neutral and 40 percent alkaline.

Moreover, when the acid protease from A. oryzae is substituted for the B. subtilis alkaline protease and only the neutral and acid proteases are employed as starting enzymes, the product contains neutral and acid protease activities which are respectively about 32 percent and 48 percent of the activities of the starting enzymes. This product has proteolytic activity in the acid and neutral pH ranges.

EXAMPLE 13

B. subtilis Neutral and Alkaline Protease and Lipase/EMA Insoluble and Soluble Adducts.

B. subtilis neutral and alkaline proteases (400 mg.) and lipase (400 mg., Lipase-MY (TM) Meito-Sangyo Co., Japan) are dissolved in 300 ml. cold 0.2 M in phosphate and 0.01 in calcium acetate, pH 7.5, and this solution is added to a cold, homogenized mixture of EMA-21(200 mg.) suspended in 100 ml. of 0.1 M phosphate, pH 7.5. The mixture is stirred overnight in the cold (4° C.) and the supernatant is separated from the insoluble material by centrifugation. After washing the solid with 0.1 M NaCl and water followed by lyophilization, there is obtained a solid which possesses 35 percent of the neutral protease activity, 47 percent of the alkaline protease activity, and 72 percent of the original lipase activity.

Dialysis of the supernatant against cold, distilled water followed by lyophilization yields a soluble solid which possesses 43 percent of the neutral protease activity, 56 percent of the alkaline protease activity, and 17 percent of the original lipase activity.

When acid protease is substituted for neutral protease, or used as starting material in addition thereto, the resulting product has characteristics differing in substantially the same manner as set forth for such acid protease products in example 12.

Employment of 1 percent hexamethylenediamine increases the amount of insoluble cross-linked product.

EXAMPLE 14

Protease, Papain and Pepsin/EMA Insoluble and Soluble Adducts.

B. subtilis neutral protease (50 mg.), crude papain (50 mg.) and pepsin (50 mg.) is dissolved in 50 ml. cold 0.1 M sodium acetate buffer and 0.01 M in calcium acetate, pH 5.0, and to this solution is added a homogenized mixture of EMA-21(200 mg.) suspended in 50 ml. cold 0.1 M sodium acetate, pH 5.0. The mixture is stirred overnight in the cold (4° C.) and the insoluble material is separated from the supernatant by centrifugation. After washing the solids five times with cold 0.1 M NaCl and twice with water, the material is lyophilized to yield a solid which possesses 32 percent of the original neutral protease activity, 48 percent of the original papain activity, and 38 percent of the original pepsin activity.

The supernatant solution is dialyzed against cold, distilled water and then lyophilized to yield a soluble solid which possesses 42 percent of the original neutral protease activity, 57 percent of the original papain activity, and 45 percent of the original pepsin activity.

Employment of 1 percent hexamethylenediamine increases the amount of insoluble cross-linked product.

The same result is obtained when the B. subtilis neutral protease is substituted by A. oryzae acid protease, but the product has increased proteolytic activity at acid pH's. The percent activities, based upon the starting native enzymes, are 25 percent papain and 52 percent acid protease (including pepsin.)

EXAMPLE 15

Neutral Protease/Lipase/Cellulase-Styrene/Maleic Anhydride Copolymers

Coupling of a mixture of neutral protease, lipase and cellulase to an alternating styrene-maleic anhydride (1:1) copolymer, in aqueous buffer medium using the conventional procedures of examples 1-13 at carrier to enzyme ratios of 1:3 to 2:1, yields insoluble polymer-neutral protease/lipase/cellulase derivatives having up to about 20 percent of the original enzymatic activities.

Employment of 1 percent hexamethylenediamine increases the amount of insoluble cross-linked product.

EXAMPLE 16

Neutral Protease/Alkaline Protease-Vinyl Methyl Ether/Maleic Anhydride Copolymers

Coupling of a mixture of neutral and alkaline-bacterial proteases produced by a *B. subtilis* fermentation to an alternating vinyl methyl ether-maleic anhydride (1:1) copolymer, in aqueous buffer medium using the conventional procedures of examples 1-13 at carrier to enzyme ratios of 1:3 to 2:1, yields insoluble polymer-neutral protease/alkaline protease derivatives having up to about 50 percent of the original enzymatic activities.

Employment of 1 percent hexamethylenediamine increases the amount of insoluble cross-linked product.

EXAMPLE 17

Neutral Protease/Alkaline Protease/Amylase-Vinyl Acetate/Maleic Anhydride Copolymers

Coupling of a mixture of neutral and alkaline bacterial proteases, to which amylase has been added, to an alternating vinyl acetate-maleic anhydride (1:1) copolymer, in aqueous buffer medium using the conventional procedures of examples 1-13 at carrier to enzyme ratios of 1:3 to 2:1, yields insoluble polymer-neutral protease/alkaline protease/amylase derivatives having up to about 60 percent of the original enzymatic activities.

Employment of 1 percent hexamethylenediamine increases the amount of insoluble cross-linked product.

EXAMPLE 18

Neutral Protease/Lipase-Divinyl Ether/Maleic Anhydride Cyclocopolymers

Coupling of neutral protease of bacterial origin and lipase to an alternating divinyl ether-maleic anhydride cyclocopolymer (having repeating units consisting of adjacent ethylenemaleic anhydride segments which are additionally bonded to each other by an ether linkage,) in aqueous buffer medium using the conventional procedures of examples 1-13 at carrier to enzyme ratios of 1:3 to 2:1, yields insoluble polymer-neutral protease/lipase derivatives having up to about 50 percent of the original enzymatic activities.

Employment of 1 percent hexamethylenediamine increases the amount of insoluble cross-linked product.

EXAMPLE 19

Neutral Protease/Alkaline Protease-Polymaleic Anhydride Polymers

Coupling of a mixture of neutral and alkaline proteases from *B. subtilis* fermentation production to a polymaleic anhydride polymer, in aqueous buffer medium using the conventional procedures of examples 1-13 at carrier to enzyme ratios of 1:3 to 2:1, yields insoluble polymer-neutral protease/alkaline protease derivatives having up to about 70 percent of the original enzymatic activities.

Employment of 1 percent hexamethylenediamine increases the amount of insoluble cross-linked product.

EXAMPLE 20

Neutral Protease/Alkaline Protease/Lipase-Polyacrylic Anhydride Polymers

Coupling of a mixture of neutral and alkaline proteases from *B. subtilis* production, and lipase, to a polyacrylic anhydride polymer, in aqueous buffer medium using the conventional procedures of examples 1-13 at carrier to enzyme ratios of 1:3 to 2:1, yields insoluble polymer-neutral protease/alkaline protease/lipase derivatives having up to about 50 percent of the original enzymatic activities.

Employment of 1 percent hexamethylenediamine increases the amount of insoluble cross-linked product.

In the same manner, the identical enzyme-polymer product is produced from polyacrylic acid, using Woodward's reagent, N-ethyl-5-phenyl isooxazolium-3'-sulfonate, as activator for the carboxyl groups of the polyacrylic acid. Similar results are obtained using polyglutamic acid and polyamic acid as the starting carboxyl-containing polymer.

EXAMPLE 21

*B. subtilis* Neutral and Alkaline Proteases and Amylase/EMA Insoluble and Soluble Adducts.

*B. subtilis* AM neutral and alkaline proteases and amylase mixture (250 mg.) is dissolved in 100 ml. cold 0.1 M in phosphate and 0.01 M in calcium acetate, pH 7.5, and to this solution is added a homogenized mixture of EMA-21 (200 mg.) suspended in 50 ml. cold 0.1 phosphate, pH 7.5. The mixture is stirred overnight in the cold (4° C.) and the insoluble material is separated from the supernatant by centrifugation. After washing the solids five times with cold 0.1 M NaCl and twice with water, the material is lyophilized to yield a solid which possesses 32 percent of the original neutral protease activity, 48 percent of the original alkaline protease activity, and 62 percent of the original amylase activity.

The supernatant solution is dialyzed against cold, distilled water and then lyophilized to yield a soluble solid which possesses 42 percent of the original neutral protease activity, 57 percent of the original alkaline protease activity, and 69 percent of the original amylase activity.

The ratio of the activity of the alkaline protease to the activity of the neutral protease in the starting materials and in the polymer-enzyme products is preferably about 0.25 to 1.2 to 1.

Employment of 1 percent hexamethylenediamine increases the amount of insoluble cross-linked product.

EXAMPLE 22

*Bacillus subtilis* Neutral Protease and Dextranase/EMA Soluble and Insoluble Products.

*B. subtilis* neutral protease (100 mg.) and dextranase (100 mg.) are dissolved in 75 ml. cold 0.1 M phosphate buffer, pH 7.5, which is also 0.01 M in calcium acetate. To this solution is added a homogenized mixture of EMA-21 (250 mg.) in 100 ml. cold 0.1 M phosphate buffer, pH 7.5. The combined mixture is stirred overnight in the cold (4° C.) and the solid is separated from the supernatant solution by centrifugation. After dialysis and lyophilization the insoluble *B. subtilis* neutral protease and dextranase/EMA product possesses 43 percent of the original protease activity and 27 percent of the original dextranase activity.

The supernatant solution is dialyzed and lyophilized to yield a soluble solid *B. subtilis* neutral protease and dextranase/EMA product which possesses 64 percent of the original protease activity and 62 percent of the original dextranase activity.

Employment of 1 percent hexamethylenediamine increases the amount of insoluble cross-linked product.

EXAMPLE 23

*B. subtilis* Neutral and Alkaline Proteases and Amylase/D-MAPAI-EMA

The partial dimethylaminopropylamine imide of EMA-21 was prepared by refluxing a mixture of EMA and a limiting amount (50 percent by weight) of N,N-dimethylaminopropylamine in xylene for five hours. During this time water was removed using a Dean-Stark trap. After water evolution had ceased, indicating completion of the reaction, the product was isolated by precipitation with hexane and drying in vacuo at 105° C. The imide product contained 8.9 percent N, indicating an imide content of 54 percent.

The *B. subtilis* AM neutral and alkaline protease and amylase mixture (500 mg.) is dissolved in 50 ml. cold 0.1 M phosphate buffer, pH 7.5, which is also 0.02 M in calcium acetate. To this solution is added a cold mixture of the DMAIPA-EMA (500 mg.) which is homogenized for one minute with 50 ml. cold 0.1 M phosphate buffer, pH 7.5. The combined mixture is stirred overnight in the cold (4° C.) The insoluble product is separated from the supernatant by centrifugation and then washed eight times with 0.1 M NaCl and five times with water and then lyophilized. The insoluble enzyme-polymer product thus obtained possesses 36 percent of the original neutral protease activity, 42 percent of the original alkaline protease activity, and 52 percent of the original amylase activity.

The supernatant solution is dialyzed against water and lyophilized to yield the soluble enzyme-polymer product which possesses 46 percent of the original neutral protease activity, 48 percent of the original alkaline protease activity, and 58 percent of the original amylase activity.

The ratio of the activity of the alkaline protease to the activity of the neutral protease in the starting materials and in the cationic polymer-enzyme product is preferably no greater than about 0.25 to 1.2 to 1.

Further, for preparation of other cationic polymer-plural enzyme products, polymers having such groups present in the molecule are employed.

Partial imides of a starting carboxyl or carboxylic acid anhydride-containing polymer, e.g., EMA, are produced by:

A. Heating a limiting amount of a secondary or tertiary aminolower-alkylamine with a water solution of the hydrolyzed or carboxyl-containing form of the polymer in vacuo at a temperature of about 100–150° C. until a constant weight has been reached and water is no longer given off. Such a reaction simultaneously results in formation of imide groups and reformation of the anhydride groups. In this manner imide-polymer products are formed which possess 5—95 percent imide linkages, the remaining carboxyl groups (i.e., 95— 5 percent, respectively) being present in the polymer as anhydride groups, the exact proportions being dependent upon the relative amounts of starting amine and polymer.

B. Alternatively, a partial amide-polymer product may be converted to the partial imide-polymer product by heating a partial amide-polymer product in vacuo at 140–150° C. until water is no longer given off. Such an imide-polymer product likewise possesses comparable proportions of imide and anhydride groups depending upon the number of amide groups originally contained in the starting partial amide-polymer product.

Partial secondary and tertiary aminolower-alkylamides of the starting carboxyl or carboxylic acid anhydride containing polymer, e.g., EMA, are obtained by contacting the polymer with a limiting amount of the selected amine in suspension in a solvent such as benzene or hexane, resulting in formation of a partial amide-anhydride derivative of the polymer, or a corresponding amide-carboxylate product thereof. The number of amide groups is dependent upon the quantity of the amine used as compared with the quantity of polymer employed. Such amide-polymer products possess 5-95 percent amide groups, with remaining carboxyl groups being present as anhydride groups.

Partial aminoester-polymer products are most conveniently prepared by heating at reflux temperatures overnight a limiting quantity of the selected aminoalcohol and carboxyl or carboxylic acid anhydride containing polymer, e.g., EMA, in a dry organic solvent such as toluene or dimethylformamide. The resulting product contains ester groups, carboxylic acid groups and anhydride groups, the respective numbers of which are determined by the quantity of aminoalcohol used in relation to the amount of polymer employed. Suitable blocking and unblocking of the amine moiety may be effected when required.

These products are reacted with the selected plurality of enzymes according to the procedure of the foregoing examples to give the desired active cationic polymer-plural enzyme product.

For nonionic polymer-plural enzyme products, neutral groups may be attached to the polymer molecule after enzyme attachment, e.g., alkylamines, aminoalcohols, and alcohols may be attached via reaction with residual carboxylic or carboxylic acid anhydride groups of the polymer in the usual fashion.

Thus, in the foregoing manner, the following additional water-soluble and insoluble products are prepared, the polymer in each case having cationic substituents: plural enzyme-dilower-alkylaminolower-alkanol esters of any of the polymers employed in the foregoing examples, plural enzyme–lower alkylaminolower-alkanol esters of any of the polymers employed in the foregoing examples, and plural enzyme–aminolower-alkanol esters of any of the polymers employed in the foregoing examples; e.g., the alkaline protease/neutral protease/amylase-dimethylaminopropanol ester of EMA, the neutral protease/alkaline protease-ethylaminobutanol ester of EMA, and the alkaline protease/neutral protease/lipase-aminoethanol ester of polymaleic or polyacrylic anhydride or acid; plural enzyme – dilower-alkylaminolower-alkylimides of any of the polymers employed in the foregoing examples, plural enzyme – lower-alkylaminolower-alkylimides of any of the polymers employed in the foregoing examples, and plural enzyme – aminolower-alkylimides of any of the polymers employed in the foregoing examples, e.g., the alkaline protease/neutral protease/amylase-diethylaminopropylimide of EMA, the neutral protease/alkaline protease-methylaminobutylimide of EMA, and the alkaline protease/neutral protease/lipase-aminopentylimide of polymaleic or polyacrylic anhydride or acid; plural enzyme - dilower-alkylaminolower-alkylamides of any of the polymers employed in the foregoing examples, plural enzyme – lower-alkylaminolower-alkylamides of any of the polymers employed in the foregoing examples, and plural enzyme – aminolower-alkylamides of any of the polymers employed in the foregoing examples, e.g., the alkaline protease/neutral protease/amylase-dimethylaminopropylamide of EMA, the neutral protease/alkaline protease-ethylaminohexylamide of EMA, and the alkaline protease/neutral protease/lipase-aminopropylamide of polymaleic or polyacrylic anhydride or acid.

It is apparent from the foregoing that the preferred polymer-enzyme products of the invention are those wherein the polymer is selected from the group consisting of (a) ethylene/maleic anhydride copolymer, styrene/maleic anhydride copolymer, vinyl methyl ether/maleic anhydride copolymer, vinylacetate/maleic anhydride copolymer, divinyl ether/maleic anhydride cyclocopolymer, polymaleic anhydride, polyacrylic anhydride, and cationic derivatives thereof, and the plurality of enzymes comprises (b) a protease plus at least one additional enzyme selected from the group consisting of another protease, lipase, cellulase, papain, pepsin, dextranase, and amylase, and preferably but not necessarily wherein the enzymes present in the polymer-enzyme product are entirely of microbiological origin. Where the requisite protease is one which is also specifically named, i.e., pepsin or papain, the additional one or more of the plurality of enzymes will obviously include another and different enzyme, although it may also be a protease.

It is to be understood that the invention is not to be limited to the exact details of operation or exact compounds, compositions, or procedures shown and described, as obvious modifications and equivalents will be apparent to one skilled in the art, and the invention is therefore to be limited only by the full scope of the appended claims, including the application of the doctrine of equivalents thereto.

We claim:

1. An enzymatically active polymer-plural enzyme product wherein a plurality of different enzymes are covalently bound through groups which are nonessential for their enzymatic activity to a polymer (a) comprising chains of carboxylic acid or carboxylic acid anhydride units, or (b) comprising units of carboxylic acid or carboxylic acid anhydride groups separated by carbon chains of at least one and not more than four carbon atoms, said carbon chains being part of a unit which contains a maximum of 18 carbon atoms, wherein the polymer is selected from the group consisting of ethylene/maleic anhydride copolymer, styrene/maleic anhydride copolymer, vinyl methyl ether/maleic anhydride copolymer, vinylacetate/maleic anhydride copolymer, divinyl ether/maleic anhydride cyclocopolymer, polymaleic anhydride, polyacrylic anhydride, and cationic derivatives thereof, said plurality of enzymes including a protease.

2. An enzymatically active polymer-plural enzyme product of claim 1, wherein said plurality of enzymes includes two different proteases.

3. An enzymatically active polymer-plural enzyme product of claim 1, wherein said plurality of enzymes includes an alkaline protease and a neutral protease.

4. Product of claim 2, wherein the polymer is an EMA-type polymer.

5. Product of claim 2, wherein the polymer is EMA.

6. Product of claim 2, wherein an additional enzyme is also present covalently bound in said polymeric structure.

7. Product of claim 6, wherein said additional enzyme is lipase or amylase.

8. Product of claim 6, wherein said additional enzyme is dextranase.

9. Product of claim 3, wherein said alkaline and neutral proteases are produced by fermentation of a micro-organism which produces a mixture of said enzymes.

10. Product of claim 9, wherein said micro-organism is a multiple enzyme-producing strain of *Bacillus* micro-organism.

11. Product of claim 9, wherein said micro-organism is a *Bacillus subtilis* strain.

12. Product of claim 9, wherein said micro-organism is *Bacillus subtilis* AM.

13. Product of claim 3, wherein the ratio of the activity of the alkaline protease to the activity of the neutral protease in the product is between about 0.25 and 1.2 to 1.

14. Product of claim 1, which is an enzymatically active water-insoluble EMA-alkaline protease and neutral protease product.

15. Product of claim 1, which is an enzymatically active water-insoluble EMA-alkaline protease, neutral protease, and amylase product.

16. Product of claim 1, which is an enzymatically active water-insoluble EMA-alkaline protease, neutral protease, and lipase product.

17. Product of claim 1, which is an enzymatically active water-insoluble EMA-neutral protease and dextranase product.

18. Product of claim 1, wherein the plurality of enzymes comprises a protease plus at least one additional enzyme selected from the group consisting of another protease, lipase, cellulase, papain, pepsin, dextranase, and amylase.

19. Product of claim 1, wherein the enzyme moieties which are present in the polymer-enzyme product are entirely of microbiological origin.

* * * * *